US011311831B1

(12) United States Patent
    Chan

(10) Patent No.: US 11,311,831 B1
(45) Date of Patent: Apr. 26, 2022

(54) AIR PURIFICATION METHOD BASED ON CLOUD PHYSICS

(71) Applicant: Pui King Chan, Rockville, MD (US)

(72) Inventor: Pui King Chan, Rockville, MD (US)

( * ) Notice: Subject to any disclaimer, the term of this patent is extended or adjusted under 35 U.S.C. 154(b) by 0 days.

(21) Appl. No.: 16/521,426

(22) Filed: Jul. 24, 2019

Related U.S. Application Data

(63) Continuation-in-part of application No. 15/009,802, filed on Jan. 28, 2016, now abandoned.

(60) Provisional application No. 62/108,906, filed on Jan. 28, 2015.

(51) Int. Cl.
    *B01D 47/05*   (2006.01)
    *B03C 3/017*   (2006.01)
    *B01D 50/00*   (2022.01)
    *B01D 46/00*   (2022.01)

(52) U.S. Cl.
    CPC ......... *B01D 47/05* (2013.01); *B01D 46/0036* (2013.01); *B01D 50/006* (2013.01); *B03C 3/0175* (2013.01)

(58) Field of Classification Search
    None
    See application file for complete search history.

(56) References Cited

U.S. PATENT DOCUMENTS 3,456,428 A * 7/1969 Frechet ................... C07C 55/14
                                                              95/214
4,042,016 A * 8/1977 Boochever ................ F24F 6/14
                                                              165/229

(Continued)

FOREIGN PATENT DOCUMENTS

CN    106123157       7/2019
EP    0555474 A1      8/1993
              (Continued)

OTHER PUBLICATIONS

Hobbs, Aerosol-Cloud Interactions, Aerosol-Cloud-Climate Interactions, 1993, Academic Press, San Diego, CA, USA, pp. 33-37.

(Continued)

*Primary Examiner* — Christopher P Jones
*Assistant Examiner* — Phillip Y Shao
(74) *Attorney, Agent, or Firm* — Covington & Burling LLP

(57) ABSTRACT

This invention is directed to an air purification method capable of removing small aerosols and a wide size range of aerosols, with minimum aerosol radius smaller than 0.01 micron. The method humidifies the air in an enclosed space and produces supersaturation at a level of at least 12 percent in at least a portion of the enclosed space so that water vapor condenses on aerosols to form water droplets. The method also coalesces the water droplets formed by supersaturation using coalescence devices that can coalesce droplets with minimum radius smaller than 0.01 micron, thereby lowering the equilibrium supersaturation, enabling water droplets to grow faster, be more stable and easier to be removed compared to when coalescence is absent. The method dehumidifies the air so that the water droplets with captured aerosols are removed. Coalescence enables droplets to grow under a lower ambient supersaturation level, thus saving a considerable amount of energy.

12 Claims, 9 Drawing Sheets

(56) References Cited

U.S. PATENT DOCUMENTS

| | | | |
|---|---|---|---|
| 4,284,609 A * | 8/1981 | deVries | F23J 15/06 |
| | | | 423/243.08 |
| 4,449,816 A | 5/1984 | Kohsaka et al. | |
| 4,790,650 A | 12/1988 | Keady | |
| 5,176,723 A * | 1/1993 | Liu | B01D 47/05 |
| | | | 95/216 |
| 5,531,801 A | 7/1996 | Sewell et al. | |
| 6,344,177 B1 * | 2/2002 | Littleford | B01D 53/40 |
| | | | 423/210 |
| 6,872,240 B2 | 3/2005 | Pellegrin | |
| 7,029,921 B2 | 4/2006 | Lee et al. | |
| 7,160,362 B2 | 1/2007 | Terada et al. | |
| 7,736,421 B2 | 6/2010 | Hering et al. | |
| 8,496,732 B2 * | 7/2013 | Culp | B01D 53/261 |
| | | | 95/52 |
| 8,728,208 B2 | 5/2014 | Langford et al. | |
| 8,801,838 B2 | 8/2014 | Hering et al. | |
| 2010/0127089 A1 * | 5/2010 | Sakami | F28F 27/00 |
| | | | 236/44 C |
| 2010/0180765 A1 * | 7/2010 | Son | B01D 47/05 |
| | | | 95/213 |
| 2018/0001249 A1 * | 1/2018 | Sher | F24F 11/0008 |
| 2018/0326345 A1 * | 11/2018 | Doherty | B01D 47/06 |

FOREIGN PATENT DOCUMENTS

| | | |
|---|---|---|
| GB | 2464170 B | 7/2011 |
| JP | 07-004497 A | 5/1988 |
| JP | 2000-042350 A | 2/2000 |
| JP | 2001070724 A | 3/2001 |
| WO | 2016083854 A2 | 6/2016 |

OTHER PUBLICATIONS

Rogers and Yau, A Short Course in Cloud Physics, 1989, Pergamon Press, Oxford, England, pp. 12-17, 44-45, 81-89, 121-149.

Wallace and Hobbs, Atmospheric Science: An Introductory Survey, 1977, Academic Press, Inc., London, UK, p. 173.

United States Environmental Protection Agency, Residential Air Cleaners : A Summary of Available Information, Aug. 2009, Second Edition.

Zhang et al., Can Commonly-Used Fan-Driven Air Cleaning Technologies Improve Air Quality? A Literature Review, Atmospheric Environment 45 (2011), 4329-4343.

Fox, R.W., Air Cleaners: Areview, Journal of Allergy and Clinical Immunology, vol. 94, No. 2, Part 2, Aug. 1994, 413-416.

Environmental Health and Engineering Inc., Emissions of Hazardous Air Pollutants from Coal-Fired Power Plants, pp. 1-39 (Mar. 7, 2011).

International Agency for Research on Cancer, World Health Organization, Air Pollution and Cancer (Straif et al. eds. 2013).

World Health Organization, IARC: Outdoor Air Pollution a Leading Environmental Cause of Cancer Deaths (Oct. 17, 2013).

World Health Organization, Ambient Air Pollution: Health Impacts.

Environmental Protection Agency, Residential Air Cleaners: A Technical Summary (3rd ed. Jul. 2018).

Sreehari Perumanath et al., Droplet Coalescence Is Initiated by Thermal Motion, Phys. Rev. Lett. 122, 104501 (2019).

* cited by examiner

```
400 ─┐
      ↓
   ┌─────────────────────────┐
   │     HUMIDIFICATION      │── 401
   │      (e.g., steam)      │
   └───────────┬─────────────┘
               ↓
   ┌─────────────────────────┐
   │     SUPERSATURATION     │── 402
   │    (high, e.g., 200%)   │
   └───────────┬─────────────┘
               ↓
   ┌─────────────────────────────────┐
   │ Capture small aerosols and wide │── 403
   │ size range of aerosols via      │
   │ condensation (e.g., r ≥ 0.001 μm)│
   └───────────┬─────────────────────┘
               ↓
   ┌─────────────────────────────────────────┐
   │ Small water droplets (unstable, tend to │── 404
   │ evaporate unless ambient supersaturation│
   │ is high); Large water droplets (more    │
   │ stable, lower equilibrium supersaturation)│
   └─────────────────┬───────────────────────┘
                     ↓
   ┌─────────────────────────────────────────┐
   │ Droplets continue to grow when          │── 405
   │ environmental supersaturation >         │
   │ equilibrium supersaturation for that    │
   │ droplet radius                          │
   └─────────────────┬───────────────────────┘
                     ↓
            ┌──────────────────┐
            │ DEHUMIDIFICATION │── 408
            └────────┬─────────┘
                     ↓
                ┌──────────┐
                │Clean Air │── 409
                └──────────┘
```

406 — COALESCENCE (lowers equilibrium supersaturation)
Droplets grow faster → Larger water droplets (407)

FIG. 4

AIR PURIFICATION METHOD BASED ON CLOUD PHYSICS

CROSS-REFERENCE TO RELATED APPLICATIONS

This application is a continuation-in-part of U.S. patent application Ser. No. 15/009,802, filed Jan. 28, 2016, entitled "AN AIR PURIFICATION SYSTEM AND PROCESS BASED ON CLOUD PHYSICS," which is incorporated herein by reference in its entirety, which in turn claims priority to U.S. Provisional Patent Application No. 62/108,906, filed Jan. 28, 2015, entitled "AN AIR PURIFICATION SYSTEM AND PROCESS BASED ON CLOUD PHYSICS," which is incorporated herein by reference in its entirety.

FIELD OF THE INVENTION

Embodiments of the invention are directed to air purification methods that reduce the level of air pollutants and dust in indoor places.

BACKGROUND OF THE INVENTION

Air pollution is a common problem in the modern world. The main sources of pollution are widespread, including transportation, power plants, as well as industrial and agricultural emissions. Air pollutants include, for example, ozone, PM2.5, heavy metals, volatile organic compounds, acid gases, and dioxins. Air pollutants can cause damages to the lungs, liver, kidneys, nervous system, eyes, skin, and immune system; some can even cause heart attacks, strokes or cancer. (Environmental Health and Engineering, Inc., *Emissions of Hazardous Air Pollutants from Coal-Fired Power Plants* 39 (Mar. 7, 2011); International Agency for Research on Cancer, World Health Organization, *Air Pollution and Cancer* (Kurt Straif et al. eds. 2013)). In 2013, the International Agency for Research on Cancer (IARC), part of the World Health Organization (WHO), classified outdoor air pollution as carcinogenic to humans and concluded that outdoor air pollution was a leading environmental cause of cancer deaths. In 2010, air pollution caused 223,000 lung cancer deaths worldwide (IARC, *Outdoor Air Pollution a Leading Environmental Cause of Cancer Deaths* (Oct. 17, 2013); IARC, *Air Pollution and Cancer* (Kurt Straif et al. eds. 2013)). PM2.5 is an important type of air pollutant that is harmful for health. PM2.5 refers to solid particles and liquid droplets in the air that are 2.5 microns in diameter or smaller. PM2.5 particles are so small that they can penetrate the deepest parts of the lungs and can even enter the blood stream. The sources of PM2.5 include fuel combustion from automobiles, power plants, and industrial processes. PM2.5 can trigger heart disease and strokes and can cause lung cancer and respiratory illnesses (WHO, *Ambient Air Pollution: Health Impacts*, available at https://www.who.int/air-pollution/ambient/health-impacts/en/). In areas of poor air quality, such as residential communities near coal-fired power plants and polluting industries, air cleaners are necessary, especially for sensitive population such as children, people with respiratory problem or heart disease, and the elderly.

Many types of air cleaners are currently available in the market. They include mechanical air filters, electronic air cleaners, gas-phase air filters, ultraviolet germicidal irradiation (UVGI) cleaners and photocatalytic oxidation (PCO) cleaners. Mechanical air filters are installed in central HVAC (Heating, Ventilating and Air Conditioning) system or in portable air cleaners and are used to capture particle pollutants on filter media. Electronic air cleaners include electrostatic precipitators and ion generators. Electrostatic precipitators use electrostatic attraction to trap particles. Ion generators disperse charged ions into the air. These ions attach to particles in the air, giving them a charge so that they can attach to nearby surfaces such as walls and furniture or to one another. Gas-phase air filters remove gaseous pollutants by using sorbent, such as activated carbon, to adsorb pollutants. UVGI cleaners use UV (ultraviolet) radiation to kill germs, bacteria, and molds. PCO cleaners use a UV lamp and a photocatalyst to create oxidants that destroy gaseous contaminants (Environmental Protection Agency, *Residential Air Cleaners: A Technical Summary* (3rd ed. July 2018), available at https://www.epa.gov/sites/production/files/2018-07/documents/residential_air_cleaners_-_a_technical_summary_3rd_edition.pdf).

Most air cleaner intervention studies have found statistically significant associations between the introduction and use of portable air cleaners in homes and at least one measure or marker of improved health outcome, but the improvements were typically modest (Environmental Protection Agency, supra). Some air cleaners may disperse existing pollutants or may even produce new, potentially toxic pollutants. For example, electronic air cleaners can produce ozone which is a potent lung irritant. If a PCO system's design parameters do not match the pollutant targeted for purification, the PCO cleaner may create, as a result of oxidation of some volatile organic compounds in indoor air, by-products that are indoor air pollutants. Saturated sorbent filters may release trapped gaseous pollutants back into the air (Environmental Protection Agency, supra).

Thus, there is a need to develop an air purifier that can significantly reduce the amount of air pollutants without introducing new pollutants and can effectively reduce health symptoms caused by air pollutants. There is also a need to develop an air purifier that can remove small air pollutants such as PM2.5.

The process of precipitation can be a useful reference for designing such an air purifier. Air is significantly cleaner and fresher after heavy rain. Aerosols, which are small solid or liquid particles in the air, are removed from the atmosphere when water vapor condenses on the aerosols forming cloud droplets and later precipitation falls from the cloud. Aerosols are also removed from the atmosphere when precipitation particles fall through the air and collect aerosols by direct impaction. Precipitation processes remove approximately 80 percent to 90 percent of the mass of aerosols from the atmosphere.

In the atmosphere, water vapor condenses on water-soluble aerosols at ambient supersaturation of approximately 2% (which corresponds to relative humidity of 102%) or less (Peter Hobbs, *Aerosol-Cloud-Climate Interactions* 233 (1st ed., Academic Press, 1993)). The process of condensation of water vapor on aerosols to form water droplets can be understood in connection with the equilibrium supersaturation for water droplets and the ambient supersaturation in the atmosphere. The equilibrium supersaturation for water droplets depends on the radius of the droplets and the types of aerosols on which the water droplet is formed, which is discussed in reference to FIG. 1 below. The ambient supersaturation in the atmosphere can be produced by the cooling of a rising air stream or by mixing of two moist air masses, the latter of which is discussed in reference to FIG. 2 below.

FIG. 1 shows how the equilibrium supersaturation for pure water droplets and water droplets of various masses of dissolved salt varies with droplet radius. FIG. 1 is reprinted from Hobbs, supra, with permission of Elsevier, and annotations added.

Condensation of water vapor in a particle-free atmosphere to form pure water droplets is governed by Kelvin's equation, as shown by the dashed curve in FIG. 1, which is also known as the Kelvin's curve. For a pure water droplet, the equilibrium supersaturation over its surface decreases as the radius of the droplet increases.

Condensation of water vapor on aerosols depends on the aerosol types. Aerosols can be classified as hygroscopic, neutral, or hydrophobic according to their affinity for water. Neutral aerosols are not water soluble. Hygroscopic aerosols are water soluble. Hydrophobic aerosols resists wetting. In this invention hydrophobic aerosols are not considered.

Condensation of water vapor on neutral aerosols requires approximately the same level of ambient supersaturation as condensation of water vapor to form pure water droplets in particle-free air (M. K. Yau & R. R. Rogers, *A Short Course in Cloud Physics* 290 (3d ed., Pergamon Press 1996)). Accordingly, condensation of water vapor on a neutral aerosol and the growth of water droplet formed by condensation on a neutral aerosol can be determined from the dashed curve (the Kelvin curve) in FIG. 1 (Hobbs, supra).

Condensation of water vapor on hygroscopic aerosol form solution droplets. The process of condensation and growth of the solution droplets can be determined from curves 2 through 7 in FIG. 1, which are also known as the Köhler curves (Rogers & Yau, supra; Hobbs, supra). As shown by the Köhler curves, the equilibrium supersaturation for droplets formed on hygroscopic aerosols is lowered as the mass of soluble salt increases according to Raoult's law. For droplets containing a fixed mass of soluble salt, the decrease in the equilibrium supersaturation is larger the smaller the droplet. The equilibrium supersaturation for very small solution droplet can be negative (i.e., relative humidity<100%).

Based on the research in Rogers & Yau, supra, the net rate of growth of a droplet is proportional to the difference between the ambient supersaturation (i.e., environmental supersaturation) and equilibrium supersaturation of the droplet. When the ambient supersaturation is lower than the equilibrium supersaturation for a droplet, the droplet is unstable because it tends to decay or evaporate. When the ambient supersaturation is greater than the equilibrium supersaturation for a droplet, the droplet is stable because it tends to grow.

For example, as shown by point C on the dashed curve in FIG. 1, in an environment with an ambient supersaturation of 0.4%, water vapor can condense on water-insoluble neutral aerosols with radius greater than 0.3 μm to form water droplets, which can continue to grow because the equilibrium supersaturation is less than 0.4% for those radii. The Köhler curves numbered 3 through 7 in FIG. 1 have peaks that are below 0.4% in supersaturation. A solution droplet with a peak in one of these Köhler curves can grow by condensation up the left side of the Köhler curve, over the peak of the curve, and down the right side of the curve (Hobbs, supra). In warm clouds (with cloud top temperature above 0° C.), the growth of droplets to raindrops is achieved by continued condensation, collision, and coalescence of droplets (Rogers & Yau, supra). When cloud droplets grow to a size of approximately 1 mm in diameter, they fall by gravity. As raindrops fall through the air, they collect aerosols by direct impaction. The larger an aerosol particle the more efficiently it can be collected by impaction.

The scientific principles behind producing ambient supersaturation in an environment is described briefly below in reference to FIG. 2 and FIG. 3.

FIG. 2 is a graph showing the vapor pressures versus temperature for the mixing of two air parcels at constant pressure, as shown in the dashed straight line 201. FIG. 2 also shows the saturation vapor pressure curve 202, which is also labeled as $e_s(T)$. The two air parcels 1 and 2 are represented by two points on the dashed straight line 201: $(T_1, e_1)$ and $(T_2, e_2)$. $T_1$ and $T_2$ represent the temperatures of the air parcels 1 and 2 respectively. $e_1$ and $e_2$ represent the vapor pressures of the air parcels 1 and 2 respectively. FIG. 2 shows that air parcel 1 has a higher temperature than that of air parcel 2, and that air parcel 1 has a higher vapor pressure than that of air parcel 2.

The mixture of the two air parcels 1 and 2 is denoted by a point (T, e), where T represents the temperature of the mixture, and e represents the vapor pressure of the mixture. The temperature T of the mixture is the mass-weighted mean of the temperatures of the two air parcels $T_1$ and $T_2$; the vapor pressure e of the mixture is the mass-weighted mean of the temperatures of the two air parcels $e_1$ and $e_1$. The saturation vapor pressure curve 202 represents the saturation vapor pressure, which is a function only of temperature according to the Clausius-Clapeyron equation. When the vapor pressure of the mixture e is higher than the saturation vapor pressure at temperature T, which is determined by the saturation vapor pressure curve 202, supersaturation occurs. This is shown in FIG. 2 where point (T, e) is located above the saturation vapor pressure curve 202 at temperature T.

FIG. 3 is a graph showing the vapor pressure versus temperature for the mixing of steam and surrounding air parcel at constant pressure, as shown in the dashed straight line 301. FIG. 3 also shows the saturation vapor pressure curve 302, which is also labeled as $e_s(T)$. Steam is represented by the point $(T_1, e_1)$, and the surrounding air parcel is represented by the point $(T_2, e_2)$. $(T_1, e_1)$ is located on the saturation vapor pressure curve $e_s(T)$ because steam is saturated. As steam mixes with the surrounding air, both the temperature and vapor pressure of the mixture fall as compared with the steam, and rise as compared to the surrounding air.

FIG. 3 shows that as steam mixes with air, supersaturation occurs on a significant portion of the dashed straight line 301 that is located above the saturation vapor pressure curve 302, until the vapor pressure of the mixture falls under the corresponding saturation vapor pressure at a given temperature. The level of supersaturation of the steam mixture can be very high. For example, when the temperature is 50° C., the supersaturation level is approximately 382%.

SUMMARY OF THE INVENTION

Certain embodiments of the invention provide an air purification method that is capable of removing small aerosols and a wide size range of aerosols, with minimum aerosol radius smaller than 0.01 micron. The air purification method humidifies the air in an enclosed space and produces supersaturation at a level of at least 12 percent in at least a portion of the enclosed space so that water vapor condenses on aerosols to form water droplets. The air purification method also coalesces the water droplets formed by said supersaturation by using coalescence devices, the minimum radius of water droplets that can be coalesced being smaller than 0.01 micron, thereby lowering the equilibrium supersaturation, enabling water droplets to grow faster, be more stable and easier to be removed compared to when coalescence is absent. The method dehumidifies the air so that the water droplets with captured aerosols are removed.

Certain embodiments of the invention provide an air purification method that is capable of removing small aerosols and a wide size range of aerosols, with minimum aerosol radius smaller than 0.05 micron. The air purification method humidifies the air in an enclosed space and produces supersaturation at a level of at least 2 percent in at least a portion of the enclosed space so that water vapor condenses on aerosols to form water droplets. The air purification method also coalesces the water droplets formed by said supersaturation, thereby lowering the equilibrium supersaturation, enabling water droplets to grow faster, be more stable and easier to be removed compared to when coalescence is absent. The method dehumidifies the air so that the water droplets with captured aerosols are removed.

In certain embodiments of the invention, all of the parts of the devices for humidifying, producing supersaturation, coalescing, and dehumidifying that come into contact with the polluted air are removable so that the parts can be replaced or cleaned.

In certain embodiments of the invention, the air purification method further includes humidifying the air using steam or superheated steam.

In certain embodiments of the invention, the air purification method further includes coalescing water droplets by (1) circulating air to cause collision of water droplets, (2) heating water droplets and generating turbulence to cause collision of heated water droplets, (3) using steam or superheated steam in humidification and circulating air to cause collision of water droplets formed by condensation of steam or superheated steam on aerosols, and (4) generating an electric field to cause polarization of water droplets.

In certain embodiments of the invention, the air purification method further includes filtering the air to be processed through a filter.

In certain embodiments of the invention, the air purification method further includes producing supersaturation by using one or more repeated cycles of two sequential steps: (1) maintaining supersaturation in the enclosed space at a certain level, and then (2) reducing the supersaturation level in the enclosed space to a level that is lower than the level in step (1); the supersaturation level in the two steps refer to the supersaturation level averaged over the enclosed space.

In certain embodiments of the invention, the air purification method further includes producing a level of supersaturation in the enclosed space that is not uniform.

In certain embodiments of the invention, the air purification method further includes leading the air to be processed into the enclosed space in successive portions, wherein for each portion of the air to be processed, the level of supersaturation averaged over the enclosed space is lowered progressively at successive time steps.

DESCRIPTION OF THE DRAWINGS

FIG. 4 is a flowchart showing how the four steps of the embodiments of the invention work together to remove small aerosols.

DETAILED DESCRIPTION OF THE INVENTION

Figure 1:
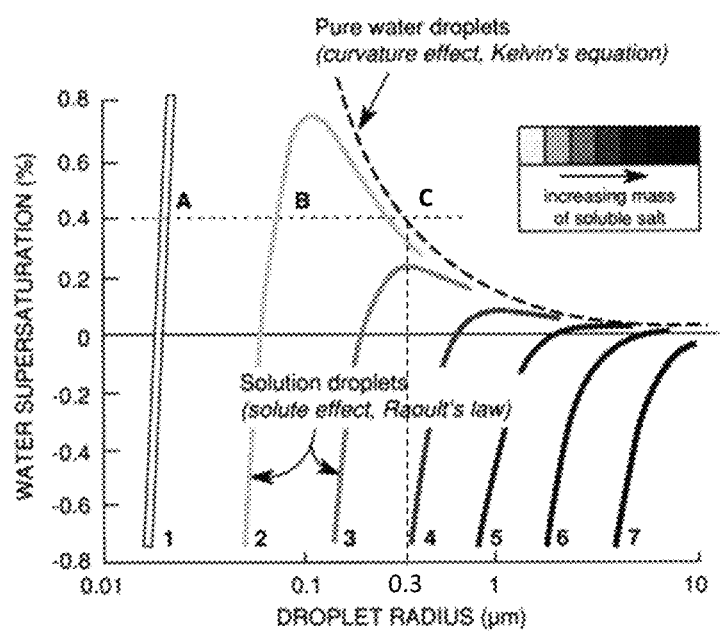
FIG. 1 is a graph showing equilibrium supersaturation over droplets of pure water and equilibrium supersaturation over droplets containing fixed masses of dissolved salt, as a function of droplet radius.
Figure 2:
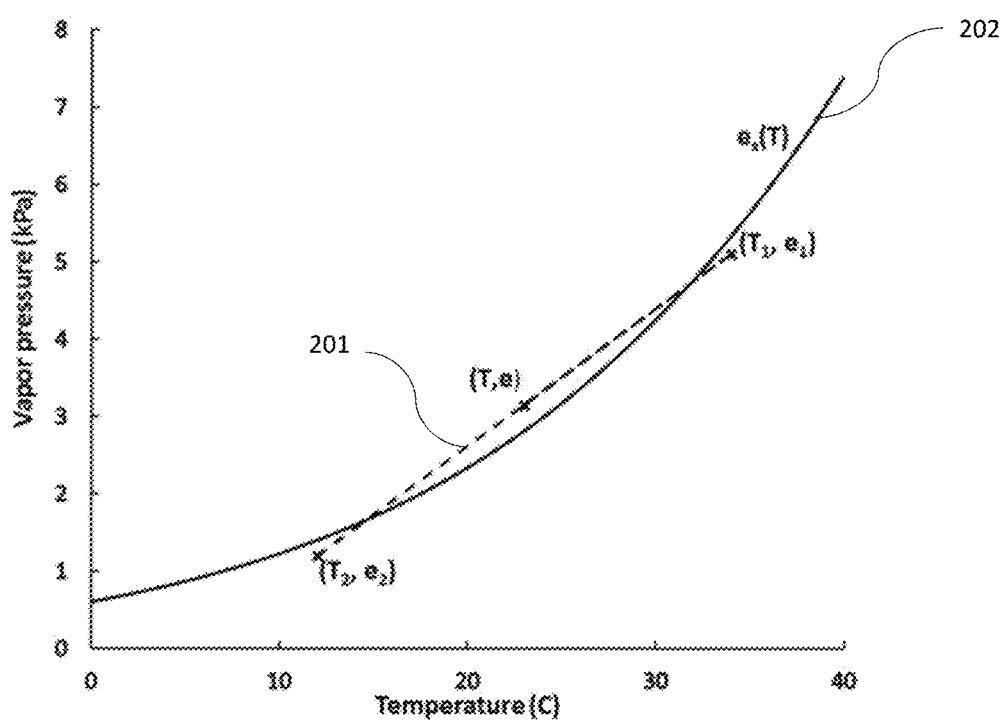
FIG. 2 is a graph showing vapor pressure versus temperature for the mixing of two air parcels at constant pressure, and the saturation vapor pressure curve.

The invention is directed to an air purification method that can remove small aerosols and a wide size range of aerosols in indoor places. The aerosols considered in the invention are air pollutants and dust. The air purification method consists of four steps: humidification, supersaturation, coalescence, and dehumidification.

FIG. 4 is a flowchart 400 showing how an air purification method according to the embodiments of the invention remove aerosols. The air purification method generally includes four steps: humidification 401, supersaturation 402, coalescence 406, and dehumidification 408.

The method starts with humidification 401, preferably with steam, to supply the air with water vapor that can condense on aerosols to form water droplets of approximately the same radius as the aerosols initially. Supersaturation 402 is then produced in the air by, for example, cooling the air, adiabatic cooling, and/or mixing two saturated air parcels at different temperatures.

A high level of supersaturation 402 enables water vapor to capture small aerosols and a wide size range of aerosols via condensation (403), forming water droplets. For example, a supersaturation level of 200% enables water vapor to capture aerosols with a radius as small as approximately 0.001 micron and to form water droplets with approximately the same radius as aerosols initially. Small water droplets are not as stable as larger water droplets and tend to evaporate unless ambient supersaturation is relatively high; large water droplets require lower ambient supersaturation to be stable and are therefore more stable than small water droplets (404). Higher ambient supersaturation is generally more difficult and expensive to maintain.

After supersaturation 402 is produced, water droplets can grow in size by coalescence 406, by continued condensation 405 as long as the ambient supersaturation is higher than the equilibrium supersaturation, or both coalescence 406 and continued condensation 405. Coalescence 406 enables water droplets to grow faster into larger water droplets 407, which have lower equilibrium supersaturation than the original water droplets. Continued condensation 405 is a relatively slow process compared to coalescence. Finally, the air is cleaned by dehumidification 408, whereby water droplets with captured aerosols are drained away. Clean air 409 is obtained after dehumidification 408.

The invention utilizes strong synergism between humidification 401, supersaturation 402, coalescence 406, and dehumidification 408. Consider the case when steam humidification is used. A stronger steam humidifier can generate more steam and produce a higher average ambient supersaturation, which can enable water vapor to capture smaller aerosols and a wider size range of the aerosols. A higher ambient supersaturation and stronger coalescence devices together can enable more small aerosols to be captured by condensation, to be coalesced, and to become stable enough to reach the dehumidifier to be removed. A stronger dehumidifier can condense more water droplets and thereby remove more aerosols. Because of the strong synergism between humidification 401, supersaturation 402, coalescence 406, and dehumidification 408, a strong humidifier, a high ambient supersaturation, strong coalescence devices, and a strong dehumidifier will render a powerful air purification method.

Figure 5:
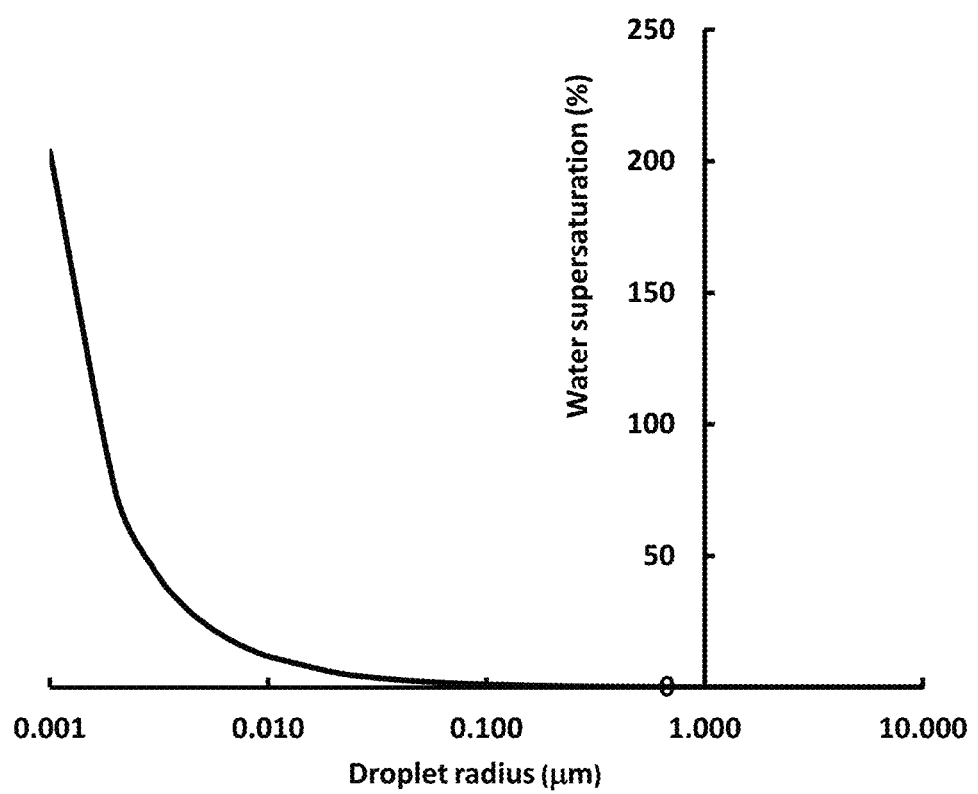
FIG. 5 is a graph showing equilibrium supersaturation for pure water droplets versus droplet radius, with supersaturation level up to approximately 200%.
Figure 6:
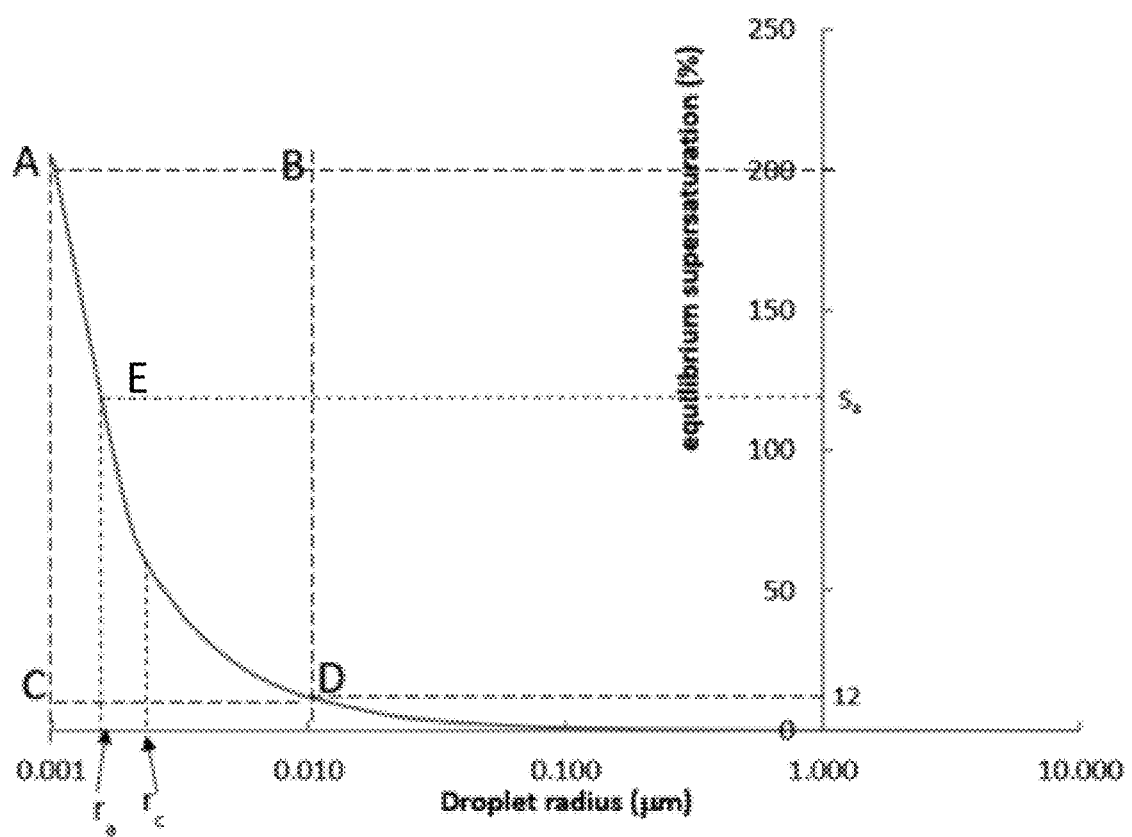
FIG. 6 is a graph that shows the same curve as in FIG. 5, and also illustrates the strong synergism between supersaturation and coalescence in the segment of the curve between points A and D.

The synergism of supersaturation 402 and coalescence 406 in the embodiments of the invention is explained in reference to FIG. 5 and FIG. 6.

FIG. 5 shows how equilibrium supersaturation for pure water droplets varies with droplet radius. The curve in FIG. 5 shows that as water droplet radius increases, the equilibrium supersaturation for water droplet decreases. The condensation of water vapor on neutral aerosols largely follow Kelvin's equation, as shown in the curve in FIG. 5. Kelvin's equation relates the equilibrium vapor pressure over a droplet's surface to the droplet radius and is given by $$e_s(r) = e_s(\infty)\exp(2\sigma/rR_v\rho_L T)$$

where $e_s(r)$ is the saturation vapor pressure over the surface of a spherical droplet of radius r with surface tension $\sigma$ and density $\rho_L$ at temperature T, $R_v$ is the gas constant for water vapor, and $e_s(\infty)$ is the saturation vapor pressure over bulk water.

The condensation of water vapor on smaller aerosols requires a minimum level of ambient supersaturation that is higher than what the condensation of water vapor on larger aerosols requires. Accordingly, the curve in FIG. 5 shows that that the higher the ambient supersaturation, the smaller the minimum radius of the aerosol and the wider the size range of aerosols that can be captured by condensation of water vapor. For instance, an ambient supersaturation of 200% can capture neutral aerosols of radius 0.001 micron and larger; whereas an ambient supersaturation of 45% can capture neutral aerosols of radius 0.003 micron and larger.

For a very small droplet to be stable, the ambient supersaturation must be very high. If the ambient supersaturation falls below the equilibrium supersaturation for the droplet, droplet will decay or evaporate. In order to remove very small aerosols, a very high supersaturation level is required to capture the aerosols by condensation and to maintain the droplets with the captured small aerosols in a stable state to reach the dehumidifier. Maintaining a very high supersaturation level throughout the region of supersaturation and throughout the whole air purification process can be expensive. This problem can be alleviated by coalescence.

Coalescence of droplets can be achieved by collision of water droplets (Rogers & Yau, supra). Coalescence can be facilitated by high temperature of water droplets when the droplets are in close proximity (Sreehari Perumanath et al., *Droplet Coalescence Is Initiated by Thermal Motion*, Phys. Rev. Lett. 122, 104501 (2019)). Coalescence can also be achieved by attraction of polarized water droplets in an electric field, which can be produced by an electrostatic coalescer, such as the ones used in oil refinery. Large droplets are generally easier to coalesce than small droplets.

Coalescence of droplets increases the droplet radius, lowers the equilibrium supersaturation, causes the droplet to grow faster and be more stable compared to when coalescence is absent, provided that the ambient supersaturation remains the same. Thus coalescence enables small droplets with captured small aerosols to reach the dehumidifier and to be removed more easily. Coalescence can also help remove more aerosols, including more small aerosols. While a relatively high ambient supersaturation is required to capture very small aerosols by condensation, a lower ambient supersaturation can be used to grow the small droplets when coalescence is present, which can save a considerable amount of energy which would be used to generate and maintain a high ambient supersaturation. Also, droplets can grow faster with coalescence as compared to when coalescence is absent.

There is synergism between supersaturation and coalescence. Coalescence of droplets lowers the equilibrium supersaturation, thus increases the growth rate of the droplets at a given ambient supersaturation. It can be seen from FIG. 6 that synergism between supersaturation and coalescence occurs when equilibrium supersaturation increases significantly with decreasing droplet radius. Based on the slope of the curve in FIG. 6 and numerical values obtained from Kelvin's equation, synergism occurs when supersaturation exceeds 2% and droplet radius is less than 0.05 micron. Synergism is especially strong for equilibrium supersaturation exceeding 12% and droplet radius smaller than 0.01 micron. This domain of strong synergism is utilized in the removal of very small aerosols in the embodiments of this invention. Synergism between supersaturation and coalescence is negligible for low supersaturation, e.g., in the realm of cloud physics where supersaturation in the atmosphere is lower than 2%.

FIG. 6 shows the same curve as in FIG. 5. FIG. 6 also shows a rectangular area marked by points A, B, C, and D. Point A on the curve shows that a pure water droplet with radius of 0.001 micron has an equilibrium supersaturation of 200%. Point D on the curve shows that a pure water droplet with radius of 0.01 micron has an equilibrium supersaturation of 12%. Point E, which is between points A and D on the curve, shows that a pure water droplet with radius $r_a$ has an equilibrium supersaturation of $S_a$.

The segment of the curve between points A and D shows the domain of strong synergism between supersaturation and coalescence. In this domain, where equilibrium supersaturation for water droplets exceeds 12% and droplet radius is less than 0.01 micron, the growth of water droplets can be facilitated and accelerated by coalescence.

The strength of a coalescence device can be measured by the minimum radius of water droplets that it can coalesce, which is referred to as $r_c$. FIG. 6 shows that a coalescence device can coalesce droplets with a minimum radius of $r_c$. In this example, $r_c$ is larger than $r_a$, and is accordingly located to the right of $r_a$ on the horizontal axis.

The minimum radius of aerosol $r_{min}$ that can be removed by the embodiments of the invention is determined by the ambient supersaturation level as well as the minimum radius of water droplets ($r_c$) that can be coalesced by coalescence devices in the air purification method. When the ambient supersaturation in the environment is uniform and is equal to $S_a$, water droplets with radius equal to or exceeding $r_a$ can continue to grow by condensation. In this case $r_{min}$ is equal to $r_a$. If coalescence is absent, droplets will grow by continued condensation. If coalescence is present, water droplets will grow by coalescence and continued condensation. Droplet growth by continued condensation is a relatively slow process whereas droplet growth by coalescence is a relatively fast process, especially when there is synergism between supersaturation and coalescence. In the domain of synergism between supersaturation and coalescence, the lowering of equilibrium supersaturation in coalesced droplet increases the rate of droplet growth. The stronger the synergism between supersaturation and coalescence, the greater the lowering of the equilibrium supersaturation and the larger the increase in the growth rate of the coalesced droplet.

If the ambient supersaturation varies in different parts of the environment, when droplets move to the parts of the environment where the ambient supersaturation is lower than their equilibrium supersaturation, the droplets will decay and evaporate, and the aerosols previously captured in the droplets will not be removed. When the maximum ambient supersaturation $S_a$ occurs in a small part of the environment, only aerosols with radius equal to or exceeding $r_a$ can be captured by condensation and only those droplets can possibly grow. Growth of droplets with radii exceeding $r_c$ is much easier compared to smaller droplets because the droplets with radii exceeding $r_c$ can grow more easily by coalescence, especially in the domain of synergism between supersaturation and coalescence. Thus when the maximum ambient supersaturation occurs in a small part of the environment, only droplets with radii exceeding $r_a$ and $r_c$ can grow easily. In the domain of synergism between supersaturation and coalescence, the rate of droplet growth of the coalesced droplet is further enhanced by the lowering of equilibrium supersaturation. Thus, coalescence, especially in the domain of synergism between supersaturation and coalescence, renders the droplet together with the captured aerosol a greater chance to reach the dehumidifier and be removed. Therefore $r_{min}$ will be the maximum of $r_c$ and $r_a$. Accordingly, if $r_c$ is larger than $r_a$, as illustrated in FIG. 6, $r_{min}$ will be equal to approximately $r_c$, The three radii $r_a$, $r_c$ and $r_{min}$ can be estimated as follows. The way in which supersaturation is produced can provide an estimate of the maximum supersaturation ($S_a$) attainable. The radius $r_a$ can be estimated from $S_a$ and FIG. 5. The radii $r_a$, and $r_c$ can also be deduced by first measuring the droplet distribution (number concentration versus droplet radius plot) using condensation nuclei counter at two time points: (1) before air purification begins, and (2) after the steps of humidification, supersaturation and coalescence have begun and before dehumidification has started. Kohsaka et al., *Method for Measuring the Number of Hyperfine Particles And a Measuring System Therefor*, U.S. Pat. No. 4,449,816 provides a method for measuring the number concentration and distribution of hyperfine particles. Number concentration of aerosols smaller than $r_a$ will remain the same because droplets cannot form on these aerosols via condensation. Thus the droplet radius $r_a$ will be the smallest droplet radius at which number concentration of droplets increase after air purification begins. Number concentration of droplets with radius r ($r_a$<r<$r_c$) will increase slightly because those droplets will grow by continued condensation, which is a slow process. In contrast, coalescence is a relatively fast process. The number concentration of droplets larger than $r_c$ will first decrease as those droplets coalesce to form larger droplets, but the number concentration of larger droplets will increase significantly. The radius $r_c$ will probably show up as a discontinuity in the droplet distribution after air purification begins.

FIG. 5 and FIG. 6 describe water droplets formed on neutral aerosols. If water vapor condenses on a hygroscopic aerosol to form a solution droplet, the aerosol will gradually dissolve and the growth of the solution droplet will be governed by the Köhler curves in FIG. 1. If the hygroscopic aerosol is small, equilibrium supersaturation will be lowered drastically by the dissolved solute, and the solution droplet will grow quickly due to the large reduction in equilibrium supersaturation. As hygroscopic aerosols continue to dissolve in the solution droplets, the Köhler curve pertaining to the droplets will move towards the right of FIG. 1, the peak of the Köhler curve will move down towards the horizontal axis in the middle of FIG. 1, approaching 0% in equilibrium supersaturation, the equilibrium supersaturation of solution droplets at a given radius will generally fall, and accordingly the growth of solution droplets by condensation will become easier.

If a solution droplet lies on the left side of the peak of a Köhler curve, coalescence will increase the droplet radius, raise the equilibrium supersaturation, and somewhat hinder the condensation process. However, the rise in equilibrium supersaturation caused by coalescence is not as significant as the reduction in equilibrium supersaturation caused by the dissolution of hygroscopic aerosols. Ambient supersaturation will still be higher than the equilibrium supersaturation of the coalesced droplet, so coalesced droplet will continue to grow; therefore coalescence does not prevent the embodiments of the invention from achieving their object.

The embodiments of the invention work best under warm and humid conditions because the saturation vapor pressure of water increases as temperature rises according to the Clausius-Clapeyron equation. As air temperature rises, more water vapor is expected to be condensed out in the dehumidifier, and more aerosols are expected to be captured by the water condensate and drained out from the water condensate in the dehumidifier. The invention is more effective in cleaning up aerosols that are soluble in water, compared to aerosols that are not soluble in water. This is because the equilibrium supersaturation for droplets can be lowered by dissolved solutes according to Raoult's law, making it easier to have the environmental supersaturation exceed the equilibrium supersaturation for the droplets. Solution droplets can grow in size easily when the environmental supersaturation is higher than the peak value of the equilibrium supersaturation according to the Köhler curve for the solution droplets.

Figure 7:
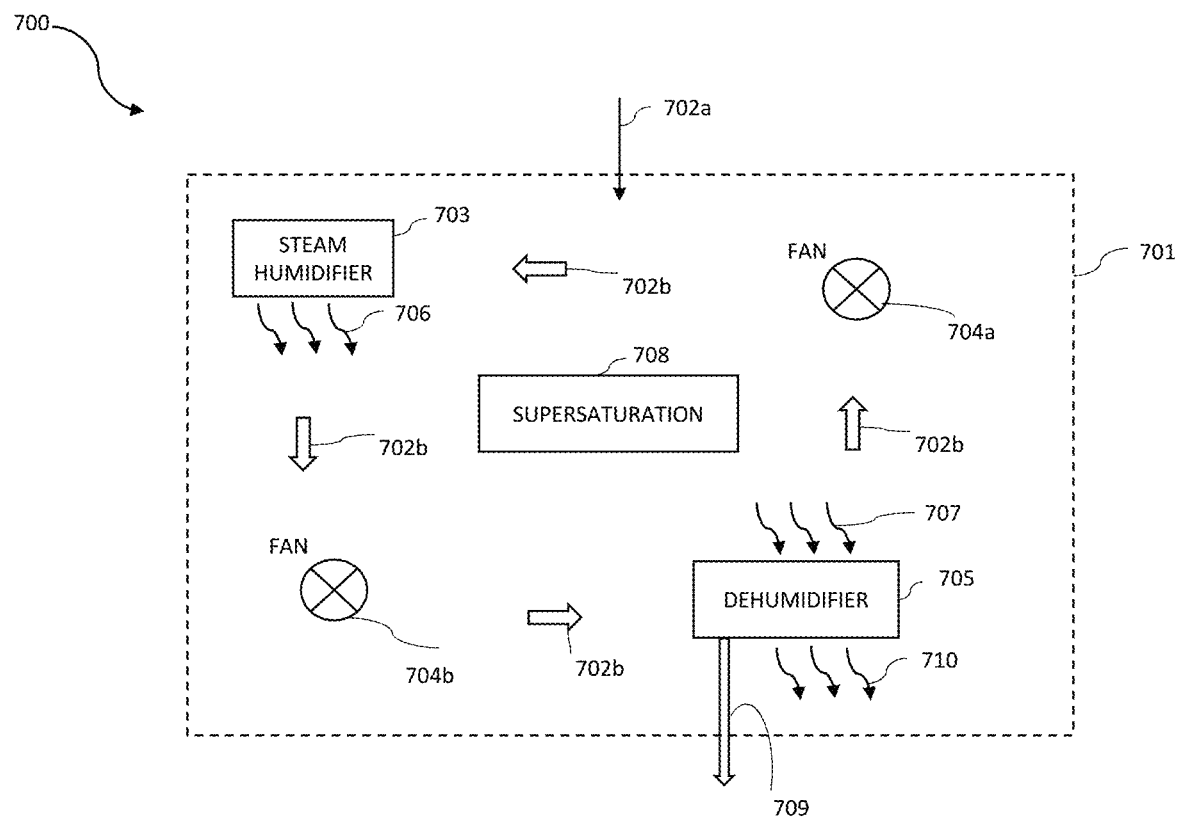
FIG. 7 is a diagram illustrating an air purification method according to a first embodiment of the invention.

FIG. 7 is a diagram 700 illustrating an air purification method according to the first embodiment of the invention. The first embodiment can be used in residential homes. Air to be processed 702a enters into a chamber 701 (e.g., a room or an enclosed space). A steam humidifier 703 and powerful oscillating fans with air flow rate at least 1000 cubic feet per minute 704a and 704b are turned on first, and then the dehumidifier 705 is turned on after the humidity in the chamber 701 has reached a substantial level (e.g., 50% or more). Strong air current 702b generated by powerful oscillating fans 704a and 704b circulate in the chamber 701. As steam 706 is emitted from the steam humidifier 703 and enters into the chamber 701, steam 706 mixes with the surrounding air at room temperature, and supersaturation 708 occurs along most part of the steam path. The supersaturation level of the steam mixture can be high (e.g., >200%). The steam mixture condenses on aerosols along its path, according to the supersaturation level of the steam mixture (FIG. 3) and the Kelvin and Köhler curves pertaining to the aerosols involved (FIG. 1, FIG. 5). Based on the discussion in connection with FIG. 5 and FIG. 6, for a steam mixture with supersaturation level of 200%, the minimum radius of neutral aerosols that can be captured by the steam mixture is approximately 0.001 micron.

The mixture of steam 706 and surrounding air at room temperature produces moistened air 707 in the chamber 701. As the moistened air 707 is drawn into the dehumidifier 705, the moistened air 707 is cooled, supersaturation occurs, and water vapor further condenses on aerosols. The water condensate together with the aerosols captured by it are drained away. In this way air pollutants and dust are removed. The dehumidified air 710 from the dehumidifier 705 is the purified air. As the heat 709 generated from the dehumidifier 705 is expelled outdoor, the air in the chamber 701 is cooled, further facilitating the condensation of water vapor on aerosols.

The use of powerful oscillating fans 704a and 704b provides several benefits. First, powerful oscillating fans 704a and 704b circulate the steam 706 in the chamber 701, enabling the steam 706 to capture more aerosols in the fans' circulations. Second, powerful oscillating fans 704a and 704b help water droplets collect aerosols more easily by direct impaction. Third, powerful oscillating fans 704a and 704b help with the collision and coalescence of water droplets. Coalescence of water droplets lowers the equilibrium supersaturation, making the water droplets grow faster and be more stable and have a higher chance to reach the dehumidifier 705 and be removed. Fourth, powerful oscillating fans 704a and 704b may help coagulation of aerosols, making their removal easier. The condensation of water vapor on neutral aerosols follows largely Kelvin's curve in FIG. 1, and the equilibrium supersaturation of water droplets formed on neutral aerosols is lower for larger aerosols than for smaller aerosols. Thus larger aerosols can have water vapor condensed on them more easily and can be removed more easily. Fifth, powerful oscillating fans 704a and 704b help circulate air in the chamber 701, enabling the air in various parts of the chamber 701 to reach the dehumidifier 705 and be cleaned. Sixth, powerful oscillating fans 704a and 704b circulate the dehumidified air 710 from the dehumidifier 705, which is the purified air output, to various parts of the chamber 701.

The use of steam 706 instead of cool mist to humidify the air in the embodiments of the invention provides several advantages. First, the high temperature of steam 706 renders supersaturation 708 along a considerable part of its path as steam 706 mixes with surrounding air at room temperature (FIG. 3), enabling condensation of steam mixture on aerosols and capturing more aerosols.

Figure 3:
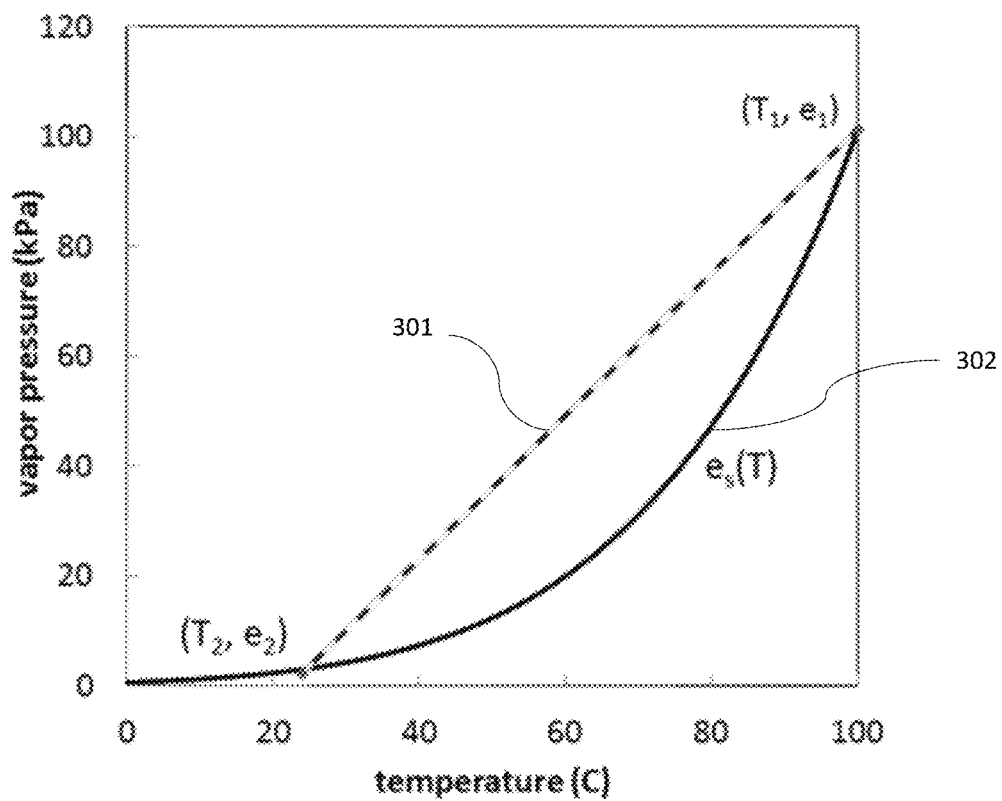
FIG. 3 is a graph showing vapor pressure versus temperature for the mixing of steam and surrounding air parcel at constant pressure, and the saturation vapor pressure curve.

Second, as steam 706 mixes with surrounding air at room temperature, a high level of supersaturation 708 is achieved because of the steam's high temperature (FIG. 3). FIG. 5 shows that the higher the supersaturation, the wider the size range of aerosols and the smaller the minimum radius of aerosol that can be captured by the steam mixture via condensation.

Third, the high temperature of steam 706 not only provides more buoyancy and higher velocity, but also provides an upward velocity and hence a longer path compared with water vapor alone, enabling more aerosols to be captured along its path.

Fourth, the high temperature of steam 706 makes it easier to remove small solid air pollutants that are water soluble. For many water-soluble solids, the solubility increases with temperature. Also, the equilibrium supersaturation over water droplets is lowered by dissolved solutes. The lowering of equilibrium supersaturation over water droplets is more significant the larger the mass of the dissolved solutes and the smaller the water droplets, as shown in the curves 2 through 7 in FIG. 1. Thus the high temperature of steam 706 may enable more water soluble solid air pollutants to dissolve in the steam 706, lower the equilibrium supersaturation significantly, and make easier the growth of the solution droplets. This advantage may be especially useful for removing PM2.5 because it is small and water-soluble.

Fifth, based on Perumanath, supra, the high temperature of steam 706 can help water droplets formed by condensation of steam mixture to coalesce when the water droplets are in close proximity of each other. Thus coalescence is facilitated when the water droplets formed on aerosols from steam mixture collide in the strong air current 702b generated by the powerful oscillating fans 704a and 704b.

The steam humidifier 703 can be, for example, an Aprilaire 800 whole house steam humidifier. The dehumidifier 705 can be, for example, a DeLonghi PAC-T110P portable air conditioner, which has a dehumidifying function. The powerful oscillating fans 704a and 704b can be, for example, a Lasko Cyclone 18-Inch Adjustable Pedestal Fan, Model 1823. The first embodiment may also include a high-efficiency particulate air (HEPA) filter, such as the VEVA premium HEPA filter, to filter the air to be processed 702a before it enters the chamber 701. For air cleaning in a very polluted environment, the steam humidifier 703, dehumidifier 705, and powerful oscillating fans 704a and 704b have to be strong. For example, the steam humidifier 703 is preferably capable of converting 1.5 liters or more of water to steam every hour. The dehumidifier 705 preferably has a moisture removal capacity of 1.2 liter/hour or more. The powerful oscillating fans 704a and 704b preferably have oscillating angles of 60 degrees or more, with airflow rate of 1000 cubic feet per minute or more.

The steam humidifier 703 is preferably made of stainless steel or other materials that do not release toxins when heated. It is preferable that the steam outlet of the steam humidifier 703 is adjustable and has a large steam output area. The steam outlet can also be adapted to a metal hose that can be adjusted to any vertical level and orientation so that cleaning is not localized.

In addition, the steam humidifier 703 can be portable. The steam output rate of the steam humidifier 703 can be adjusted. The dehumidifier 705 has a large water tank to hold the condensate and preferably an exhaust hose to expel to outdoor the heat 709 generated. A pumping system and a long hose can be included in the dehumidifier 705 to drain away the condensate continuously to a sink.

In addition, the dehumidifier 705 can be portable and can have a humidistat to control the relative humidity. A HEPA filter can be installed in the air in-take grille of the ventilation system of a residential home if the major pollution source is outside the home.

The first embodiment of the invention was tested on an asthma patient who lived near a coal-fired power plant for a period of six months. The test results on the patient indicated that the first embodiment could significantly reduce health symptoms including asthma, high blood pressure, chest pain, and numbness, which were probably caused by the air pollutants PM2.5, heavy metals and volatile organic compounds (Environmental Health and Engineering, Inc., supra). The test results were consistent with the capability of the invention shown in the theory—that the embodiments of the invention can capture water soluble air pollutants and neutral water insoluble air pollutants with radius of 0.001 µm or larger, including PM2.5, heavy metals, and volatile organic compounds.

The first embodiment of the invention can remove small aerosols and a wide size range of aerosols. The first embodiment of the invention can be a powerful air purification process due to the synergism between humidification, supersaturation, coalescence and dehumidification. It can be seen that the higher the supersaturation achieved and the more powerful the humidification device, the coalescence devices, and the dehumidification device, the larger the number of aerosols and the more small aerosols can be removed. Moreover the first embodiment is simple, safe, cheap and the equipment are easily available. Thus the first embodiment can be useful to clean up residential homes after a chemical weapon attack.

Figure 8:
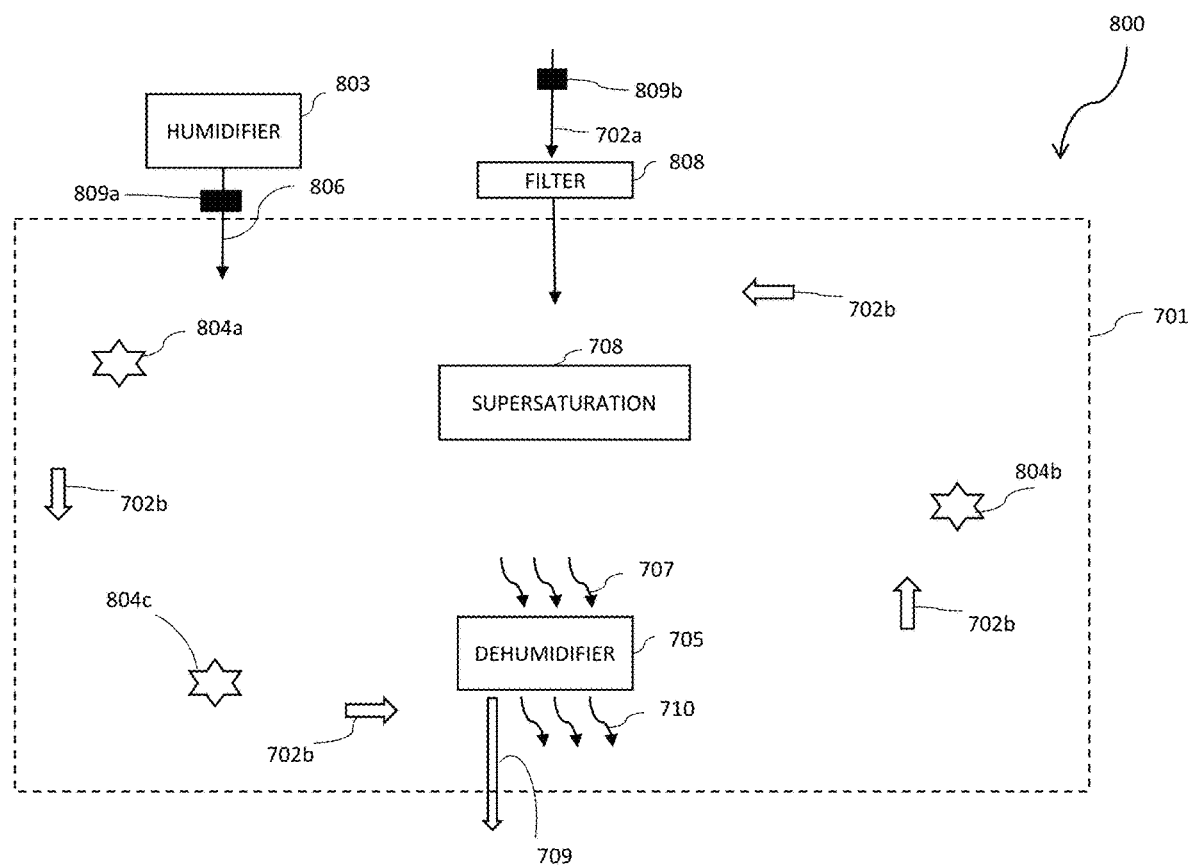
FIG. 8 is a diagram illustrating an air purification method according to a second embodiment and a third embodiment of the invention.

FIG. 8 is a diagram 800 illustrating an air purification method according to the second and third embodiments of the invention.

In the second embodiment, air to be processed 702a enters into chamber 701. A humidifier 803 humidifies the air within the chamber 701 by supplying water vapor 806 to the air. Water vapor 806 could include steam 706, superheated steam (steam that is well above 100° C.) or cool mist. Humidifier 803 can be, for example, an Aprilaire 800 whole house steam humidifier. Supersaturation 708 of at least 12 percent is then produced in at least a portion of the chamber 701 so that water vapor can condense on aerosols to form water droplets.

Coalescence devices 804a, 804b, and 804c can coalesce the water droplets formed by supersaturation 708 in a variety of ways, in conjunction with a humidifier 803. For example, coalescence devices 804a, 804b, and 804c can generate strong air current 702b or turbulence to cause collision of water droplets. Coalescence devices 804a, 804b, and 804c can generate an electric field to polarize water droplets. Coalescence is initiated by thermal motion when the droplets are in close proximity, with higher chances of coalescence when droplets are at higher temperature (Perumanath et al, supra). Steam or superheated steam (steam that is well above 100° C.) from humidifier 803 together with the strong air currents from coalescence devices 804a, 804b, and 804c can cause coalescence when the water droplets formed from steam mixture collide in the strong air currents. Coalescence devices can generate hot air currents and turbulence to heat up the water droplets in its circulation and cause collisions of water droplets in the air current or turbulence. Coalescence is enhanced by the high temperature of the water droplets when these droplets are in close proximity with each other during collisions. Coalescence can occur in any combination of the above.

The mixture of water vapor 806 and surrounding air at room temperature produces moistened air 707 in the chamber 701. The dehumidifier 705 dehumidifies the moistened air 707 so that the water droplets with captured aerosols are removed from the air. The air to be processed 702a may pass through a filter 808 before entering the chamber 701. The filter 808 is preferably a high-efficiency particulate air (HEPA) filter, such as the VEVA premium HEPA filter. The dehumidified air 710 from the dehumidifier 705 is the purified air. The heat 709 generated from dehumidification is expelled outside the chamber 701 to keep the air in chamber 701 at room temperature or lower.

The first setting of the second embodiment can take advantage of the strong synergism between supersaturation and coalescence, as shown in the segment of the curve between points A and D in FIG. 6. The second embodiment produces supersaturation 708 exceeding 12% in parts of the chamber 701. The coalescence devices 804a, 804b, and 804c, together with any steam or superheated steam that may be used, are sufficiently strong that the minimum radius of droplets that can be coalesced is less than 0.01 micron. Based on the discussion of FIG. 5 and FIG. 6, the first setting of the second embodiment can remove aerosols with minimum radius less than 0.01 micron as well as a wide size range of aerosols exceeding this minimum radius.

The second setting of the second embodiment applies in the domain of synergism between supersaturation and coalescence. The second setting produces supersaturation 708 exceeding 2% in parts of the chamber 701. The coalescence devices 804a, 804b, and 804c, together with any steam or superheated steam that may be used, are sufficiently strong that the minimum radius of droplets that can be coalesced is less than 0.05 micron. Note that there is virtually no synergism for supersaturation less than 2% and droplet radius exceeding 0.05 micron. Based on the discussion of FIG. 5 and FIG. 6, the second setting of the second embodiment can remove aerosols with minimum radius less than 0.05 micron as well as a wide size range of aerosols exceeding this minimum radius.

The third embodiment takes advantage of the strong synergism between supersaturation and coalescence when the supersaturation level exceeds 12%. A high ambient supersaturation is required to capture small aerosols and a wide size range of aerosols to form water droplets and to grow the water droplets so formed. However, when coalescence is present, particularly in the region of strong synergism between supersaturation and coalescence as described above, coalesced droplets can grow under a much lower ambient supersaturation, which can save a considerable amount of energy that would be used to generate and maintain a high ambient supersaturation.

In the third embodiment, the ambient supersaturation level can vary within the chamber 701. Small droplets can form in regions of high ambient supersaturation. If these small droplets are coalesced and then move to a region of lower ambient supersaturation, the coalesced droplets will continue to grow as long as the ambient supersaturation exceed the equilibrium supersaturation pertaining to the droplet radii. So small aerosols which are captured in a region of high ambient supersaturation, with coalescence, may be able to grow in region of lower ambient supersaturation and eventually be removed. Thus with coalescence, more small aerosols can be removed by the air purification process compared to when coalescence is absent. An example of non-uniform supersaturation is supersaturation produced by mixing steam with surrounding air. Supersaturation can be as high as approximately 382% inside the steam parcel and varies appreciably depending on the mass ratio of steam and air in the steam mixture (FIG. 3).

In the third embodiment, the ambient supersaturation level can vary in time. A humidifier 803 humidifies the air within the chamber 701 by supplying water vapor 806 (such as steam 706 or cool mist) to the air. If steam 706 is used in the humidification and supersaturation, the level of supersaturation 708 in the chamber 701 can be changed by adjusting the rate of flow of steam 706 and the air to be processed 702a by using control devices 809a and 809b (such as valves) respectively. Coalescence devices 804a, 804b, and 804c are turned on throughout the air purification process. When the relative humidity of the chamber has reached a substantial level (e.g., 60%), the dehumidifier 705 is turned on.

The time variation of the ambient supersaturation level over the chamber 701 can be implemented in a number of different ways. Consider the supersaturation level averaged over the entire space in chamber 701, thereafter called the average supersaturation level. Suppose the space in chamber 701 can be divided into n regions; each region has a different supersaturation level. The supersaturation level averaged over the entire space in chamber 701 is the mean of the levels of supersaturation in each region as weighted by the volume of each region, i.e.

$$S_m = \frac{\sum_{i=1}^{i=n} S_i * V_i}{\sum_{i=1}^{i=n} V_i}$$

Where $S_m$, $S_i$, and Vi denote the supersaturation level average over entire space, supersaturation level at region i, and the volume of region i respectively.

As one example, the average level of supersaturation 708 in the chamber 701 is adjusted in two steps, alternating between a high level and a low level. In the first step, a supersaturation level higher than 12% is produced in the entire chamber 701 so that small aerosols are captured via condensation of water vapor 806 on these aerosols. The length of the first step can be adjusted so that the small water droplets can grow by continued condensation and coalescence. In the second step, the average supersaturation level in the chamber 701 is reduced. The two steps can be repeated a number of times. This implementation can be used when polluted air continuously flows to the air purification system.

As another example, the average ambient supersaturation level over the chamber 701 is lowered progressively in a number of successive time steps. In the first time step, a very high average ambient supersaturation (well above 12%) over the entire chamber 701 is produced to capture the small aerosols and a wide size range of aerosols. More time is allowed in the first time step to let the water vapor 806 to condense on small aerosols and grow the small droplets formed by condensation on the small aerosols. This is because water vapor 806 will preferentially condense on large aerosols and large droplets rather than the small droplets due to the lower equilibrium supersaturation for the large droplets. Nevertheless the large droplets will soon be removed by the dehumidifier 705. Also more time is allowed in the first time step to let the water droplets formed on captured aerosols to grow by coalescence and continued condensation. In the subsequent time steps, the average supersaturation level over the chamber 701 is reduced progressively in each step. This implementation can be a preliminary part of the air cleaning procedure used to purify highly polluted air with very small aerosols. The air to be processed 702*a* can be sent to the chamber 701 for purification in small portions. When one portion of the air is being purified in chamber 701, air to be processed 702*a* can be cut off from entering the chamber 701 temporarily.

Figure 9:
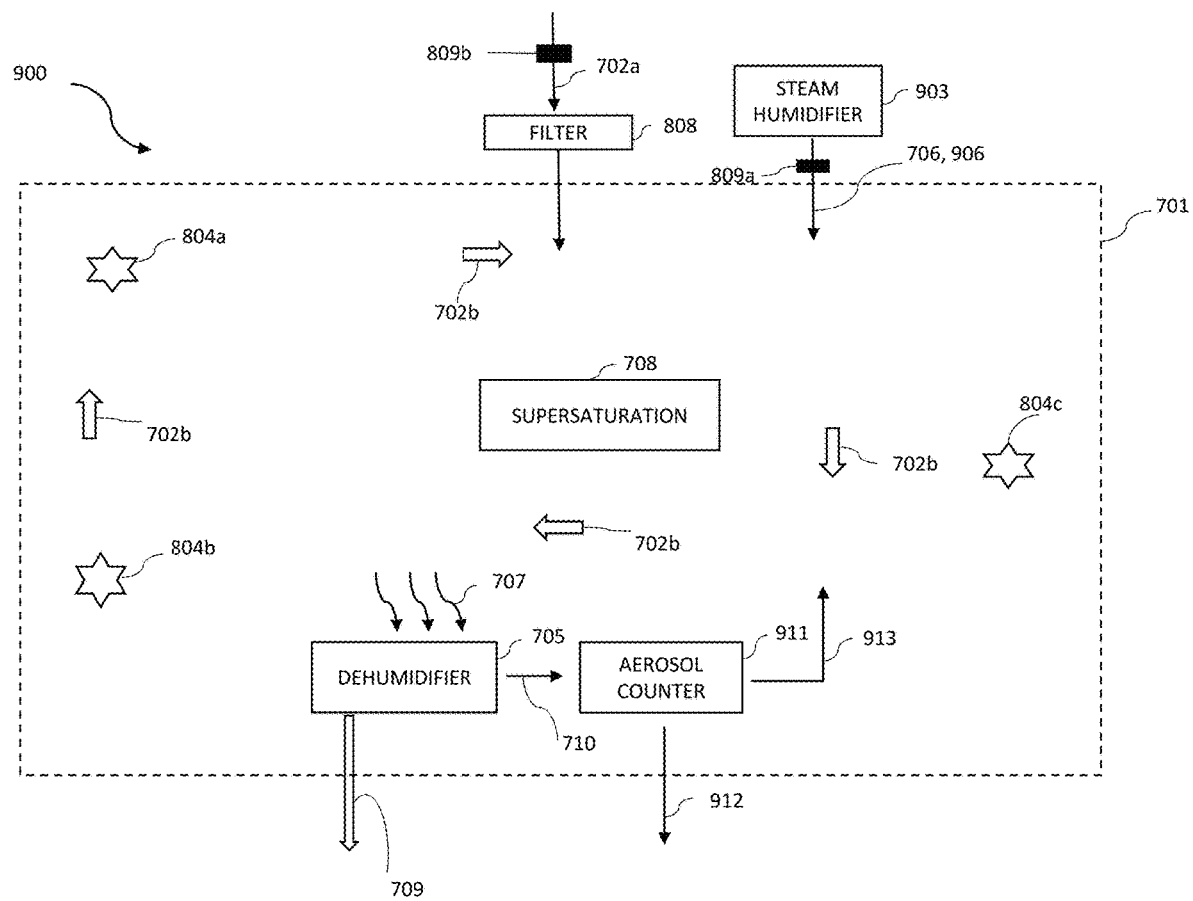
FIG. 9 is a diagram illustrating an air purification method according to a fourth embodiment and a fifth embodiment of the invention.

FIG. 9 is a diagram 900 illustrating an air purification method according to the fourth and fifth embodiments of the invention.

The fourth embodiment can be used to provide air for a clean room. The air to be processed 702*a* is first passed through a filter 808, such as an ultra-low particulate air (ULPA) filter, before entering a chamber 701. Steam humidifier 903 supplies steam 706 around 100° C. or superheated steam 906 well above 100° C. to the chamber 701 where steam 706 or superheated steam 906 mixes with the air. Superheated steam 906 has two advantages over steam 706. First, superheated steam 906, when mixed with ambient air, can produce higher level of supersaturation 708 than that is generated by mixing steam 706 with air. Second, superheated steam 906 in the presence of strong air current 702*b* facilitates coalescence of water droplets formed by condensation of the steam mixture on the aerosols because the temperature of superheated steam 906 is higher than that of steam 706. The temperature of the air within the chamber 701 is maintained at room temperature or below to help generate a high level of supersaturation 708 when it is mixed with steam 706 or superheated steam 906. Supersaturation 708 of steam mixture can be above 200%, enabling ultrafine aerosols with radii of 0.001 micron and larger aerosols to be captured. Coalescence devices 804*a*, 804*b*, and 804*c* are used to help with the coalescence and growth of water droplets formed by supersaturation 708. The mixture of steam 706 or superheated steam 906 and surrounding air at room temperature produces moistened air 707 in the chamber 701. The moistened air 707 in the chamber 701 is drawn into a dehumidifier 705 to be dehumidified.

The inflow of steam 703 or superheated steam 906 and air to be processed 702*a* can be adjusted by control devices 809*a* and 809*b* such as valves. The aerosol concentration of the dehumidified air 710 is measured by an aerosol counter 911. If the aerosol concentration is higher than the desirable level, the dehumidified air 710 will be directed back 913 into the chamber 701 and cleaned again. If the aerosol concentration is equal to or lower than the desirable level, purified air 912 is obtained. The whole cleaning cycle (mixing with steam 706 or superheated steam 906, coalescence, and dehumidification) can be repeated several times until the aerosol concentration of the dehumidified air 710 falls to or below the desirable level.

The fifth embodiment can be used indoor where a HVAC (heating, ventilation, and air conditioning) system is used. Air to be processed 702*a* is filtered through a filter 808 before entering a chamber 701. Strong air current 702*b* generated by coalescence devices 804*a*, 804*b*, and 804*c* circulates in the chamber 701. A steam humidifier 703, coalescence devices 804*a*, 804*b*, and 804*c*, and a dehumidifier 705 are placed in the chamber 701. The steam humidifier 703 generates steam 706. The dehumidifier 705 can have an exhaust hose that expels to the outside the heat 709 generated during the dehumidification, a draining hose to drain the condensate to a sink, and an output air hose to direct the dehumidified air 710 to the air duct that distributes the purified air 912. The dehumidifier 705 can also have a control switch to direct the dehumidified air 710 to the output air duct or back (913) to the chamber 701 to be cleaned again. Such a control switch will be useful in case the air purification system is used for clean-up after a chemical weapon attack. The chamber 701 and the condensate drain should be cleaned regularly. Control devices 809*a* and 809*b* can control the flow of the steam 706 and the inflow of the air to be processed 702*a* to the chamber 701 respectively. Other control devices can also control the flow of the dehumidified air 710, monitor the water level in the steam humidifier 703, automatically refill the water tank in the steam humidifier 703 when the water level is low, and automatically shut off the steam humidifier 703 when the water is almost depleted. For indoor places such as a hospital, an aerosol counter 911 may be desirable to monitor the pollutant level of the dehumidified air 710.

For the clean-up after a chemical weapon attack, the air to be processed 702*a* is shut off temporarily until the outdoor toxic pollutants level falls to a safer level. The flow rate of the air to be processed 702*a* should be carefully monitored and adjusted by a control device 809*b*. The aerosol concentration of the dehumidified air 710 is measured by an aerosol counter 911. If the aerosol concentration is higher than the desirable level, the dehumidified air 710 will be directed back 913 to the chamber 701 and cleaned again. If the aerosol concentration is lower than or equal to the desirable level, the purified air 912 will be directed to the clean air duct for distribution. The whole cleaning cycle (mixing with steam 706, coalescence, and dehumidification) can be repeated several times until the aerosol concentration of the dehumidified air 710 falls to or below the desirable level and is safe to breathe.

In the second and third embodiments of the invention, humidification of the air can be achieved by any humidification device that supplies water vapor to the air. Steam is water vapor generated by boiling water. Using steam in humidification has several advantages as described above. There is no specific limitation to the type of humidification device that can be used in the embodiments of the invention.

In the embodiments of the invention, dehumidification of the air can be achieved by any dehumidification device that cools the air so that water vapor condenses out. There is no specific limitation to the type of dehumidification device that can be used in the embodiments of the invention. The dehumidification device can include an exhaust hose that expels to outdoor the heat generated during dehumidification, so that the air being processed can be maintained at room temperature or below.

In the embodiments of the invention, the coalescence device can be any device that helps the water droplets coalesce. There is no specific limitation to the type of coalescence device that can be used in the embodiments of the invention. Powerful oscillating fans and powerful air current generation devices are examples of coalescence devices. A coalescence device can be an electrostatic coalescer similar to electrostatic coalescers used in water-in-crude-oil emulsions. An electrostatic coalescer can generate turbulence, causing collision of water droplets. An electrostatic coalescer can also generate an electric field that polarizes water droplets. The electric force among the polarized water droplets increases the probability of coalescence when droplets collide. If the coalescence device can heat the water droplets (e.g., by generating hot air currents), coalescence may be further enhanced. Using steam in humidification has the advantage of facilitating the coalescence of water droplets formed by condensation of steam mixture on aerosols when the droplets are in close proximity with each other.

In the embodiments of the invention, there is no specific limitation to the ways in which supersaturation in the environment is produced. The mixing of steam and ambient air is a simple way to produce high supersaturation which enables ultrafine aerosols and coarse aerosols to be captured. Supersaturation can be achieved by cooling the air at the normal pressure. Supersaturation can also be achieved by cooling the air in a chamber when the pressure is reduced. Supersaturation can also be obtained by mixing superheated steam with surrounding air.

In the embodiments of the invention, it is preferred that all parts of the air purification system that come into contact with the polluted air can either be replaced or cleaned, thereby avoiding contamination of the dehumidified air by air pollutants previously captured and deposited on the air purification system.

The invention has been described with some preferred embodiments thereof and it is understood that many changes and modifications in the described embodiments can be carried out without departing from the scope and the spirit of the invention that is intended to be limited only by the claims.

The invention claimed is:

1. An air purification method capable of removing small aerosols and a wide size range of aerosols, with minimum aerosol radius between 0.001 micron and 0.01 micron, comprising:
humidifying air in an enclosed space,
producing supersaturation at a level of at least 12 percent in at least a portion of the enclosed space so that water vapor condenses on aerosols to form water droplets;
coalescing the water droplets formed by said supersaturation by using coalescence devices, minimum radius of water droplets that can be coalesced being between 0.001 micron and 0.01 micron, thereby lowering equilibrium supersaturation, enabling water droplets to grow faster, be more stable and easier to be removed compared to when coalescence is absent,
dehumidifying the air so that water droplets with captured aerosols are removed,
wherein producing supersaturation comprises one or more repeated cycles, wherein each cycle includes at least two steps: (1) maintaining supersaturation in the enclosed space at a certain level, and (2) reducing the supersaturation level in the enclosed space to a level that is lower than the level in step (1), wherein the supersaturation level in the two steps refer to the supersaturation level averaged over the enclosed space.

2. The air purification method of claim 1, wherein at least one part of at least one of devices for humidifying, producing supersaturation, coalescing, and dehumidifying that come into contact with polluted air are removable so that the at least one part can be replaced or cleaned.

3. The air purification method of claim 1, wherein humidifying the air comprises humidifying the air with steam or superheated steam.

4. The air purification method of claim 1, wherein coalescing water droplets comprises one or more of the following: (1) circulating air to cause collision of water droplets, (2) heating water droplets and generating turbulence to cause collision of heated water droplets, (3) using steam or superheated steam in humidification and circulating air to cause collision of water droplets formed by condensation of steam or superheated steam on aerosols, and (4) generating an electric field to cause polarization of water droplets.

5. The air purification method of claim 1, further comprising filtering air to be processed through a filter before humidifying the air.

6. The air purification method of claim 1, wherein the level of supersaturation produced in the enclosed space is not uniform.

7. An air purification method capable of removing small aerosols and a wide size range of aerosols, with minimum aerosol radius between 0.001 micron and 0.01 micron, comprising:
humidifying air in an enclosed space,
producing supersaturation at a level of at least 12 percent in at least a portion of the enclosed space so that water vapor condenses on aerosols to form water droplets;
coalescing the water droplets formed by said supersaturation by using coalescence devices, minimum radius of water droplets that can be coalesced being between 0.001 micron and 0.01 micron, thereby lowering equilibrium supersaturation, enabling water droplets to grow faster, be more stable and easier to be removed compared to when coalescence is absent, dehumidifying the air so that water droplets with captured aerosols are removed, and leading air to be processed into the enclosed space in successive portions, wherein for each portion of the air, the level of supersaturation averaged over the enclosed space is lowered at successive time steps.

8. The air purification method of claim 7, wherein at least one part of at least one of devices for humidifying, producing supersaturation, coalescing, and dehumidifying that come into contact with polluted air are removable so that the at least one part can be replaced or cleaned.

9. The air purification method of claim 7, wherein humidifying the air comprises humidifying the air with steam or superheated steam.

10. The air purification method of claim 7, wherein coalescing water droplets comprises one or more of the following: (1) circulating air to cause collision of water droplets, (2) heating water droplets and generating turbulence to cause collision of heated water droplets, (3) using steam or superheated steam in humidification and circulating air to cause collision of water droplets formed by condensation of steam or superheated steam on aerosols, and (4) generating an electric field to cause polarization of water droplets.

11. The air purification method of claim 7, further comprising filtering air through a filter before humidifying the air.

12. The air purification method of claim 7, wherein the level of supersaturation produced in the enclosed space is not uniform.

\* \* \* \* \*